F. P. McCOLL.
SOLDERING MACHINE.
APPLICATION FILED SEPT. 28, 1910.

1,206,876.

Patented Dec. 5, 1916.
4 SHEETS—SHEET 1.

Witnesses:
Harry S. Gaither
Ruby V. Brydges.

Inventor:
Francis P. McColl
by Chamberlin & Freudenreich
Attys

F. P. McCOLL.
SOLDERING MACHINE.
APPLICATION FILED SEPT. 28, 1910.

1,206,876.

Patented Dec. 5, 1916.
4 SHEETS—SHEET 2.

Witnesses:
Harry S. Gaither
Ruby V. Brydges.

Inventor:
Francis P. McColl
by Chamberlin & Freudenreich
Attys

F. P. McCOLL.
SOLDERING MACHINE.
APPLICATION FILED SEPT. 28, 1910.
1,206,876.
Patented Dec. 5, 1916.
4 SHEETS—SHEET 3.
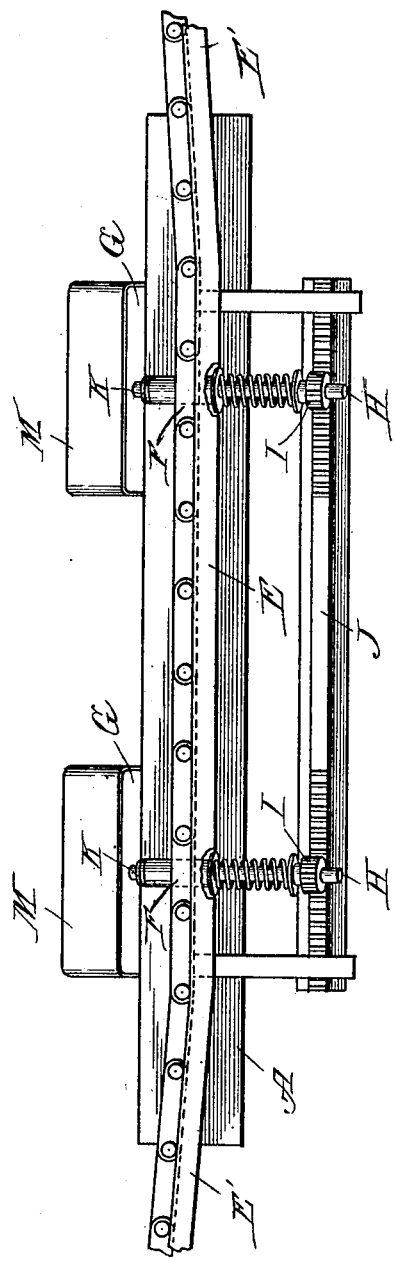
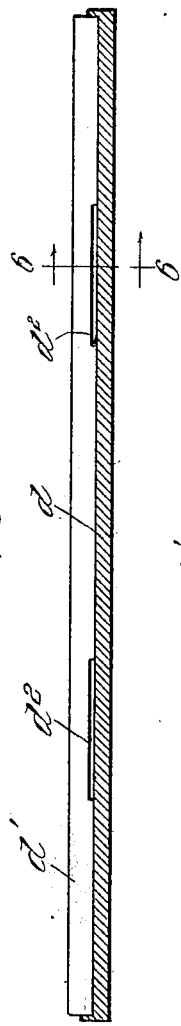
Witnesses:
Harry S. Gaither
Ruby V. Brydges
Inventor:
Francis P. McColl
by Chamberlin+Freudenreich
Attys

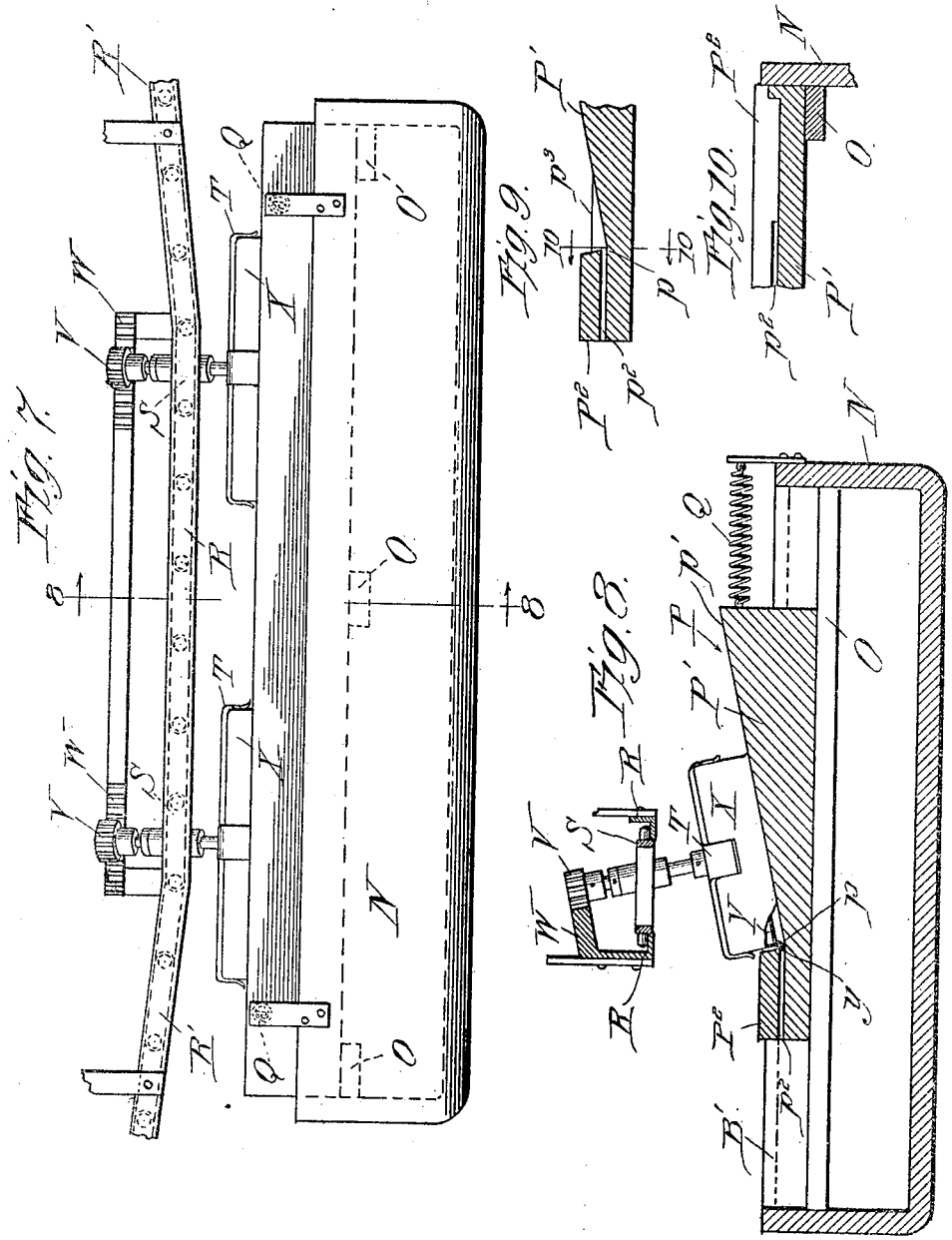

UNITED STATES PATENT OFFICE.

FRANCIS P. McCOLL, OF ST. ANDREWS, NEW BRUNSWICK, CANADA, ASSIGNOR TO AMERICAN KEY CAN COMPANY, OF CHICAGO, ILLINOIS, A CORPORATION OF NEW JERSEY.

SOLDERING-MACHINE.

1,206,876.   Specification of Letters Patent.   Patented Dec. 5, 1916.

Application filed September 28, 1910. Serial No. 584,166.

*To all whom it may concern:*

Be it known that I, FRANCIS P. McCOLL, a citizen of the United States, residing at St. Andrews, New Brunswick, Dominion of Canada, have invented a certain new and useful Improvement in Soldering-Machines, and declare the following to be a full, clear, and exact description of the same, such as will enable others skilled in the art to which it pertains to make and use the same, reference being had to the accompanying drawings, which form a part of this specification.

My invention relates to the art of soldering and has for one of its objects to provide a simple and novel device for applying molten solder to a joint in such a way as to reduce the quantity of solder used to a minimum and prevent the solder from creeping farther than into the joint to be soldered.

A further object of my invention is to provide a simple and novel soldering machine or apparatus whereby cans may be soldered quickly and effectively, without waste of solder, and without marring the decorations which there may be on the cans.

Figure 1:
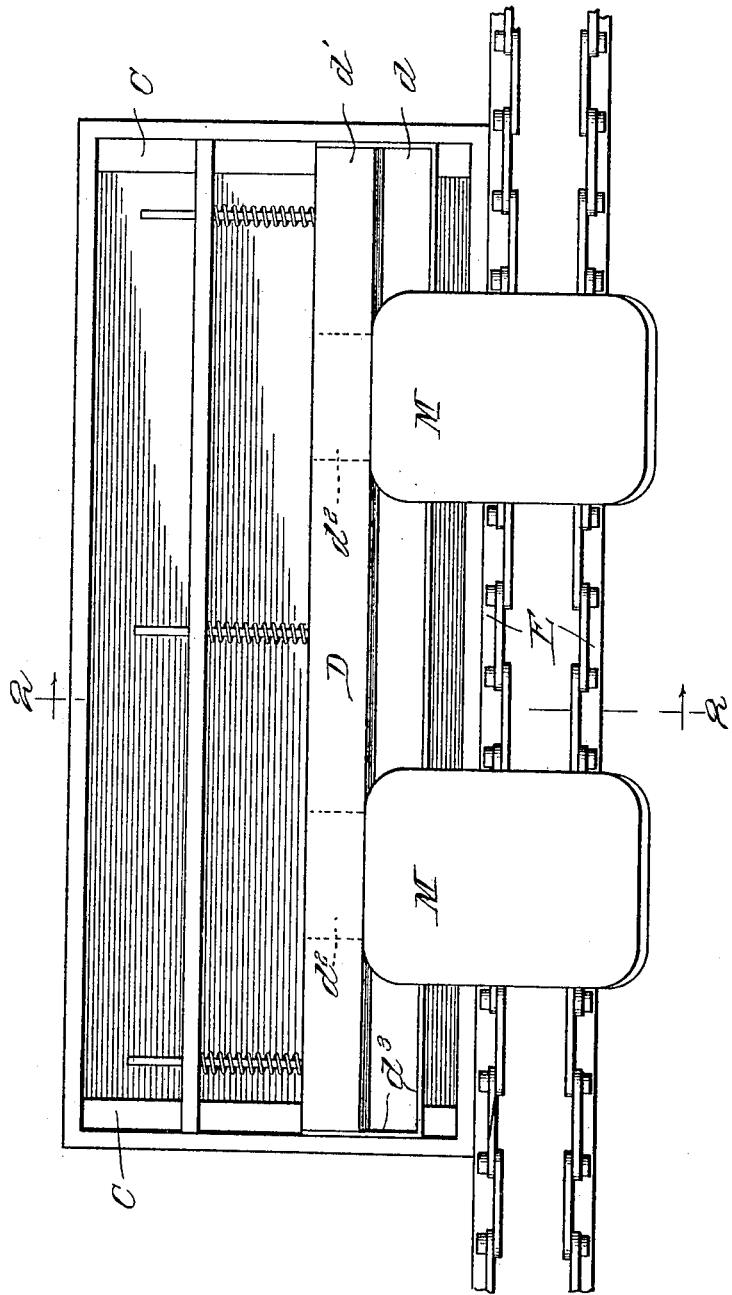
Figure 3:
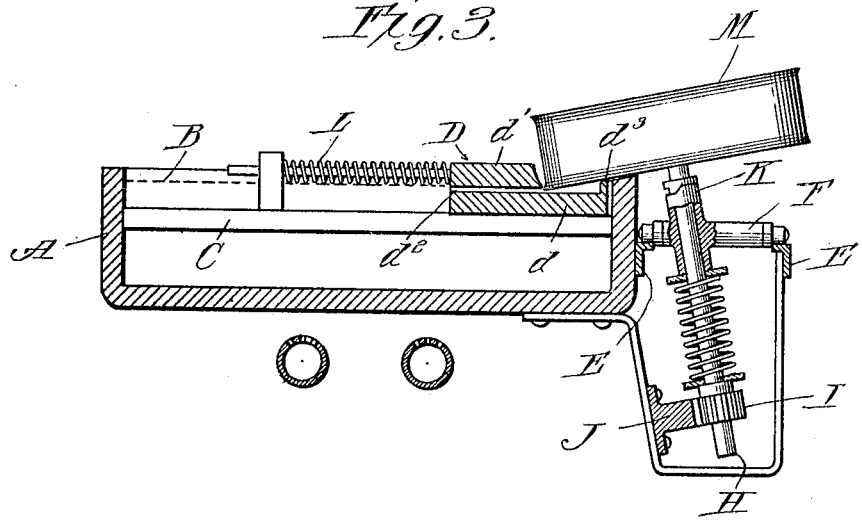
Figure 2:
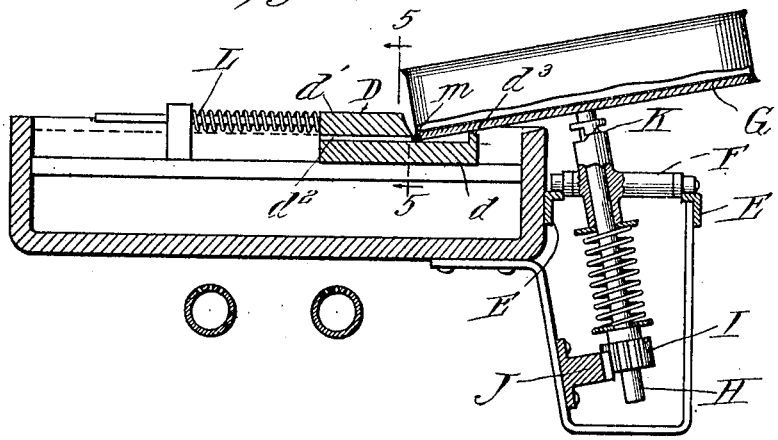

The various features of novelty whereby my invention is characterized will hereinafter be pointed out with particularity in the claims; but for a full understanding of my invention and of its objects and advantages, reference may be had to the following detailed description taken in connection with the accompanying drawing, wherein:

Figure 1 is a plan view of a machine arranged in accordance with one form of my invention; Fig. 2 is a section on line 2—2 of Fig. 1; Fig. 3 is a view similar to Fig. 2 showing the condition of the parts after the can has been rotated through an angle of 90 degrees from the position indicated in Fig. 2; Fig. 4 is a side elevation looking toward the left in Fig. 2; Fig. 5 is a section on line 5—5 of Fig. 2, showing only the soldering iron; Fig. 6 is a section on line 6—6 of Fig. 5; Fig. 7 is a side elevation showing a different form of machine; Fig. 8 is a section on line 8—8 of Fig. 7; Fig. 9 is a section through the soldering iron; and Fig. 10 is a section on line 10—10 of Fig. 9.

A joint, after it has been fluxed, may be soldered by dipping it into a bath of molten solder, but joints treated in this manner use considerable solder since the solder creeps past the joints over surfaces which should be kept clean, thus wasting solder and detracting from the appearance of the parts which are soldered together. I have found that by confining molten solder within a restricted passage, the process of soldering by dipping may be carried out quickly and conveniently without wasting solder and without allowing the solder to creep over areas where it is not desired. I make use of this principle to produce soldered joints and furthermore make provision for keeping all of the parts except the joint cool so that a head may be soldered into a can after the can has been filled, without danger of leaks produced by gases blowing from the interior of the can through the partially formed joint.

In carrying out my invention I make use of a device of some kind having a restricted passage therethrough, one end of which is in communication with a mass of molten solder, the other end of which is adapted to form the outlet through which solder is supplied to a joint which is brought adjacent to the outlet and moved relative thereto. The parts are so proportioned that the solder does not flow freely through the passage but has sufficient resistance to prevent considerable quantities from flowing rapidly into the joint and past the same over the sides and ends of a can. In addition to retarding the flow when a fluxed joint is placed at the mouth of the passage, I prevent any flow under normal conditions as long as the surface at the end of the column of solder in the passage remains unbroken; this latter being accomplished by making the walls of the passage close enough together to enable the film of solder at the discharge end of the column to form a retaining wall for holding the column back.

Referring to the first six figures of the drawings: A represents a suitable container for molten solder which is adapted to be supplied in any suitable way so as to maintain a level approximately at the line indicated by B. C, C represent horizontal guides or tracks extending across the container below the solder level. D is a soldering iron resting loosely upon the tracks or guides so as to be free to move back and forth along the same. Viewed in one aspect, the soldering iron comprises a table *d* having a part thereof, at least, lying in the neighborhood of the solder level, together with a thick upwardly projecting wall *d'* along one edge of the table for holding back the solder. In accordance with my invention I cut a restricted passage $d^2$ through the wall in such a position that one end of the passage opens into the solder while the other end leads to the depressed portion of the table. This passage may take various forms but I prefer to make it in the form of a shallow slot of any desired length. By making the wall thick, the slot is given considerable width so that, by making it shallow in the vertical direction, it acts in the same manner as the passage through a capillary tube. In other words, the solder will flow into the slot, either through a slight head of solder in the bath or by reason of capillary action; but normally the solder will not leave the outlet end of the slot above the depressed portion of the table by reason of the surface tension at the end of the column of solder in the slot. When the surface of the solder at the end of the column is broken, as, for example, when the edge of a can is inserted in the outlet end of the slot, the restraint on the column, due to surface tension, is removed and, if the edge of the can be fluxed, the solder will run up on the can. Because of the width of the slot there is considerable resistance to the movement of the solder and therefore it will not flow as rapidly as would be the case if the can were simply dipped into an open bath. It will thus be seen that if a can is brought with its joint extending into the slot and is then drawn along the slot and rotated, an effective seal may be produced without giving the solder time to creep past the joints along the sides or the head of the can. It will also be seen that by properly supporting and manipulating the can, there will be no occasion for heating the contents of the can even slightly, so that the joint will be sealed without danger of the appearance of blow holes due to gases generated or expanded within the interior of the can. The soldering iron illustrated is made long enough to provide room for a plurality of short slots, two being shown. Thus a can may be soldered doubly if desired. This is not essential, however, as a single soldering operation, properly carried out, is sufficient, and therefore the soldering iron may have any desired length and be provided with only a single slot.

In the arrangement shown in Figs. 1 to 6, the table portion of the soldering iron is provided with a raised flange $d^3$ extending around the edges thereof, thus preventing solder from flowing over the edges of the table even when the top is depressed below the level of the solder in the bath. I do not wish to limit myself to the use of this flange, however.

Along the side of the solder container I have arranged some tracks E, E, over which a suitable conveyer F is adapted to pass. At suitable intervals along the conveyer are arranged can holders adapted to support cans with one of the joints or seams extending across the soldering iron and into the outlet end of the slot. The holders are indicated at G and are supported upon revoluble shafts H so that they may be turned as the cans pass along the soldering bath and thus turn the cans so as to feed each joint progressively into the soldering iron. I prefer to arrange the holders so that they will support the cans in an inclined position, thus holding the body of the cans out of contact with the soldering iron and preventing them from becoming heated except where the solder enters the joints. The holders may be rotated in any suitable manner as, for example, by placing pinions I on the shafts H and causing these pinions to mesh with a stationary rack bar J while they are passing along the solder bath. In the arrangement shown the cans are illustrated as being rectangular and as being supported from beneath. Consequently, as the cans are rotated, the height of the joint at the soldering iron varies according to the radial distance of that portion of the joint from the axis of rotation. I have therefore provided a cam device K on each of the revoluble shafts for the purpose of raising and lowering the can bodily in such a manner as to bring each portion of the joint to the same level when it crosses the soldering line. Unless the cans be circular, it is necessary to produce relative lateral movements between the cans and the soldering iron as the cans are rotated in order to keep each portion of the joint in proper relation to the slot in the soldering iron. This is most conveniently accomplished by providing a spring L or other suitable yieldable actuating device which always tends to force the soldering iron toward the can thus causing the iron to follow it as the radial distance from the joint to the axis of rotation diminishes and to recede in front of the can as this radial distance increases. The tracks E E may be inclined upwardly at the ends of the bath as indicated at E′ E′, thus raising the cans above the solder container after the soldering operation has been completed.

In Fig. 2 the cam M is shown in the position wherein its long axis lies at right angles to the length of the slot, the joint $m$ projecting into the outlet end of the slot in the soldering iron. As the carrier or conveyer moves along the tracks, the pinion I, meshing with the rack J, is caused to rotate and rotates the holder and can. The solder flows out of the slot and into the joint and new solder takes its place. As the radial distance from that portion of the joint is in operative relation to the slot varies, the cam device K permits the can to be raised and lowered and the spring L permits the soldering iron to move from and toward the can until the can has made a complete rotation. When the can has reached the point where the tracks begin to rise it is lifted above the soldering iron and the container for the molten solder and is carried away. It will be seen that there can be no splashing of solder and no heating of the can so that the exterior of the can will remain clean, its decorations will not be marred, and a tight joint will be insured because of the absence of internal pressure in the can.

In Figs. 7 to 10 I have shown a somewhat different arrangement, N representing the solder container, O the tracks or guides and P the soldering iron. In this form the soldering iron is made wide enough to permit the can to rest upon the top of the same and be supported thereby. The iron is illustrated as consisting of a wedge-shaped member P' which gradually rises from one end, as at $p$, from a level at or slightly below the level of the solder, to a level considerably above the solder at the other end, $p'$. $P^2$ is a wall or ledge similar to the wall $d'$ in the other form and lying in advance of the lowest portion of the wedge-shaped member. $p^2$ is a passage or slot through the member $P^2$, similar to the passage or slot $d^2$ in the other form. The solder in the bath is adapted to be kept at a level indicated approximately by the line B' so that the solder will enter the passage or slot $p^2$ and will form a column having its end at the lowermost point $p$ of the wedge-shaped block. If desired, ledges $p^3$ may be provided at the end of the iron so as to prevent the solder from flowing across the top of the wedge-shaped member where it descends to or below the level of the solder. Q is a spring tending to draw the soldering iron along the tracks and toward one side of the container. Above the container I arrange a pair of tracks R upon which travels a suitable carrier or conveyer S. At suitable intervals along the carrier or conveyer are holders T which grip the cans to be soldered from above. The holders are mounted on revoluble shafts having pinions V at their upper ends and these pinions mesh with a suitable rack bar W arranged parallel with the tracks. In this arrangement the cans X rest upon the wedge-shaped portion of the soldering iron and are carried lengthwise of the same when the carrier or conveyer is set in operation. Where the cans are rectangular or are of any other shape than round, the shafts U are preferably mounted so as to be capable of limited axial movements. Therefore the portion of the joint which is adapted to receive solder from the slot would always be at the right level regardless of the radial distance from that portion of the joint to the axis of rotation. As this radial distance varies, the soldering iron moves back and forth as in the other arrangement, being drawn in one direction by the spring and being forced in the opposite direction by the can itself against the tension of the spring. In this machine as in the other, the tracks may be inclined upwardly at the ends as indicated at R', so as to permit the cans to be lowered upon the soldering iron at one end as they reach the bath, and to be raised just before they leave the bath.

My invention is not limited to the soldering of any particular kind of joint or to joints between the heads and bodies of cans. However, I have found that very striking results are obtained with cans of a particular kind. Where a can is formed in the manner illustrated in Fig. 8, the head Y being cup-shaped and having its flange directed outwardly it will be seen that the head may be pressed into the body so as to secure a sufficient degree of tightness to prevent loss of contents when the can is inverted long enough to pass it through the soldering machine. Furthermore the can is supported upon a double flange or foot which holds the head of the can raised above the soldering iron and prevents the contents of the can from being heated by conduction. Furthermore, by moving the can at the proper rate of speed, there will be no danger of solder creeping high enough to produce heating of the contents of the can from this cause. The best results have been produced by bending the free edge of the flange of the can laterally as indicated at $y$ so as to produce a small fin which projects beyond the body of the can and readily breaks into the surface of the solder forming the end of the column in the slot.

It will thus be seen that in both forms of my invention illustrated, a soldered joint may be made with a minimum amount of solder, without injuring the appearance of the can or defacing the decorations, and without heating any portion of the can except the narrow strips which are soldered together, so that a tight joint is insured by the absence of internal pressure. Thus I am enabled to form the final closure in filled cans with the same ease and convenience as a seam or a joint in an unfilled can. In fact, by using cans such as illustrated in Fig. 8 I have been enabled to solder cans which have been filled with oil, without losing any of the oil or finding leaks in the joints after the soldering operation was completed.

While I have illustrated and described in detail several forms of my invention which will operate successfully, I do not desire to be limited to the details of construction and arrangement so illustrated and described, but intend to cover all forms and arrangements which fall within the terms employed in the definitions of my invention constituting the appended claims.

What I claim is:

1. In a soldering machine, a solder bath, a member movably mounted in said bath and having a restricted passage extending therethrough from a point in the bath to a point outside of the bath, a can holder located adjacent to said bath and arranged to rotate a can with the joint between a head and the can body lying in proximity to the outlet end of said passage, and means for moving said member so as to maintain the outlet end of the passage in operative relation to the joint in the can.

2. In a soldering machine, a solder bath, a table movably mounted in the bath with its upper surface extending into the vicinity of the upper surface of the solder, said table having an upwardly extending wall along one edge there being a restricted passage through said wall from a point in the bath to a point adjacent to the top of the table, a can holder located adjacent to the bath and arranged to support a can with the joint between a head and the can body extending across the outlet end of said passage, means for rotating said holder, and means for yieldingly pressing said table so as to maintain said wall in engagement with the can.

3. In a soldering machine, a solder bath, stationary tracks extending across the bath below the surface of the solder, a member slidably mounted on said tracks and having a portion depressed to about the level of the solder, said member having a raised portion between the depressed portion and the solder, there being a restricted passage through said raised portion from a point within the bath to said depressed portion, a can holder located adjacent to said bath and constructed and arranged to hold a can with the joint between a head and the can body in said depressed portion and in proximity to the adjacent end of said passage, means for rotating said holder to bring different portions of the joint progressively into operative relation to said passage, and a tension device for moving said member along the tracks to maintain a constant relation between said member and the can as the can is rotated.

4. In a soldering apparatus, a solder bath and a member engaging with the solder and having a restricted open passage therethrough from a point in the bath to a point outside of and below the upper surface of the bath, said passage being of considerable length and of such transverse dimension as to retard the flow of solder therethrough and permit the solder in the passage to be held by surface tension from flowing out of the passage.

5. In a soldering machine, a solder bath, a member movably mounted in said bath and having a restricted passage extending therethrough from a point in the bath to a point outside of the bath, a can holder located adjacent to said bath and arranged to rotate a can with a joint in proximity to the outlet end of said passage, and means for yieldingly pressing said member toward said holder.

6. In a soldering apparatus, a solder bath, a table supported in said bath with its upper surface slightly below the upper surface of the solder, a thick upwardly extending wall along one edge of the table, said wall having an elongated narrow slot extending therethrough from a point in the bath to a point adjacent to the top of the table, a holder located adjacent to said table for bringing a joint between parts to be soldered into proximity to the outlet end of said slot, and means for yieldingly pressing said table toward said holder.

In testimony whereof, I sign this specification in the presence of two witnesses.

FRANCIS P. McCOLL.

Witnesses:
SARA H. KANE,
JESSIE M. PEABODY.

Copies of this patent may be obtained for five cents each, by addressing the "Commissioner of Patents, Washington, D. C."